United States Patent [19]

Gray

[11] 4,245,789

[45] Jan. 20, 1981

[54] ELECTROMAGNETIC FUEL INJECTOR

[75] Inventor: Leo A. Gray, Grand Rapids, Mich.

[73] Assignee: General Motors Corporation, Detroit, Mich.

[21] Appl. No.: 35,523

[22] Filed: May 3, 1979

[51] Int. Cl.[3] .............................................. F16K 31/06

[52] U.S. Cl. .................................... 239/585; 251/141

[58] Field of Search ................. 239/585; 251/129, 141

[56] References Cited

U.S. PATENT DOCUMENTS

| | | | |
|---|---|---|---|
| 1,587,921 | 6/1926 | Ray | 251/141 X |
| 3,729,025 | 4/1973 | Silvestrini | 251/141 X |
| 3,737,141 | 6/1973 | Zeuner | 251/141 X |
| 4,027,850 | 6/1977 | Allen | 251/141 |

*Primary Examiner*—Robert W. Saifer

*Attorney, Agent, or Firm*—Arthur N. Krein

[57] ABSTRACT

In an electromagnetic fuel injector at least one and preferably the physically softer one of the opposed working air gap surface of the pole piece and armature of the injector solenoid assembly has a roughened surface texture thereon with an average surface roughness rating value of the order of 16 to 32 microinches.

4 Claims, 5 Drawing Figures

ELECTROMAGNETIC FUEL INJECTOR

FIELD OF THE INVENTION

This invention relates to electromagnetic fuel injectors and, in particular, to a solenoid structure for use in such electromagnetic fuel injectors.

DESCRIPTION OF THE PRIOR ART

Electromagnetic fuel injectors are used in the fuel injection systems for vehicle engines because of the capability of this type injector to inject a precise metered quantity of fuel per unit of time. Such electromagnetic fuel injectors, as used in vehicle engines, are normally calibrated, so as to inject a predetermined quantity of fuel per unit of time, prior to their installation in a fuel system for a particular engine.

However, it has been found that during extended usage of such an injector, the injector flow repeatability of the electromagnetic fuel injector deteriorates with cumulative operation cycles. This change in the flow rate of individual electromagnetic fuel injectors will adversely effect the original desired operational function of the engine, in particular, the desired air-fuel ratio of the induction fluid being supplied to the engine. Desirably, an electromagnetic fuel injector performance with respect to flow change should be restricted so as to be in the low order of 3% to 5% maximum change in flow repeatability in $400\times10^6$ injector cycles, especially for injectors used, for example, in the fuel injection system in a modern vehicle engine.

It has now been found that one cause of flow change during extended usage of an electromagnetic fuel injector is due to wear of the opposed working air gap surfaces of the pole piece and armature of the solenoid assembly in such an injector. This wear occurs on these surfaces with or without a non-magnetic shim positioned therebetween. The wear of these working air gap surfaces is such that these surfaces become very smooth whereby the percent of true contact area between the surfaces of the pole piece and armature increases with time.

Magnetically, this increase of the true contact area between the surfaces of the pole piece and armature will tend to increase the level of remanent force between the pole piece and armature. Hydraulically, the break away force associated with the hydraulic stiction or adhesion (surface tension force) between these surfaces would also be increased. The hydraulical adherence force level due to hydraulic stiction or adhesion is approximately an order of magnitude greater than the remanent magnetic force level. Thus, this increased contact area between the working air gap surface of the pole piece and armature contributes significantly to injector flow shift because the closing response time of the injector will increase as the hydraulic adherence level and the remanent force increases.

One theory as to why these opposed air gap surfaces become smoother is because of "cavitation" wear, that is a material erosion process which occurs due to collapse of fluid vapor bubbles generated as these two opposed surfaces are forced to separate with a thin fluid film between them. However, there is no absolute certainty that these surfaces become smooth due to cavitation. This uncertainty is due to the fact that in most cases, cavitation is associated with erosion and an increase in surface roughness.

Regardless of the actual reason as to why these working air gap surfaces become smoother, the fact remains that Applicant has found that these surfaces do become smoother during extended operation of an electromagnetic fuel injector and that as a result of this wear the injector flow repeatability deteriorates. This is due, at least in part, to the fact that the level of stiction or adherence force is a function of the true contact area between the adjacent surfaces.

SUMMARY OF THE INVENTION

The present invention relates to an improved electromagnetic fuel injector so constructed that at least one, preferably the physically softer of the opposed working air gap surfaces of the pole piece and armature of the injector solenoid assembly thereof is provided with an average surface roughness rating value on the order of 16 to 32 microinches.

It is therefore a primary object of this invention to provide an improved electromagnetic fuel injector having at least one of the opposed working air gap surfaces of the pole piece and armature thereof provided with a predetermined surface roughness whereby wear of these surfaces is substantially reduced to provide for increased operation flow repeatability and therefore operational durability of the injector.

Another object of the invention is to provide an improved electromagnetic fuel injector construction that utilizes a predetermined surface roughness on at least one of the opposed working gap surfaces of the pole piece and armature of the solenoid assembly thereof whereby to provide for decreased hydraulic stiction between these surfaces.

A further object of the invention is to provide an improved electromagnetic fuel injector having at least one of the opposed working air gap surfaces of the pole piece and armature of its injector solenoid assembly provided with a predetermined roughened surface texture, the lay of which extends at least two directions.

For a further understanding of the invention, as well as other objects and further features thereof, reference is had to the following detailed description of the invention to be read in connection with the accompanying drawings.

DESCRIPTION OF THE EMBODIMENTS

Figure 1:
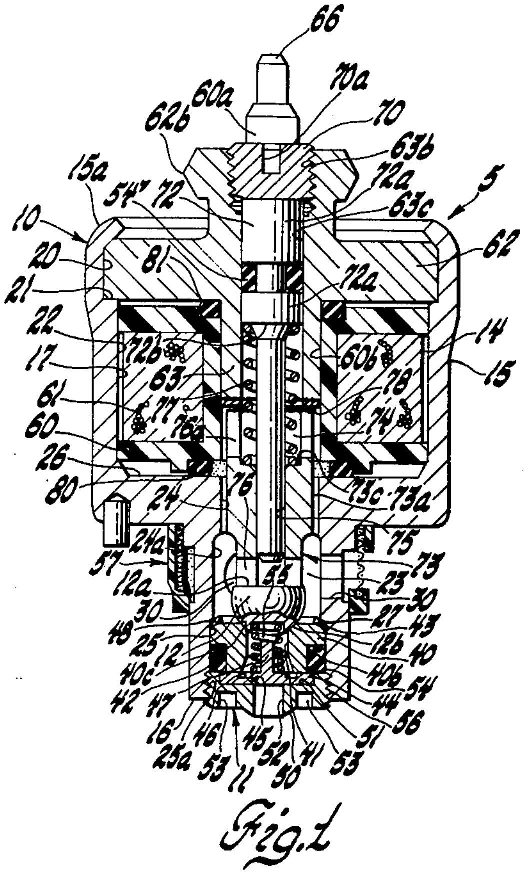
FIG. 1 is a longitudinal cross-section view of an exemplary embodiment of an electromagnetic fuel injector having the working air gap surfaces of the pole piece and armature thereof provided with a roughened surface in accordance with the invention, the armature guide pin and valve member of the injector assembly being shown in elevation, but with part of the valve member broken away.

Referring now to FIG. 1, there is shown an electromagnetic fuel injector, generally designated 5 which may be of any suitable type used for pulse injection of gasoline fuel into the induction system of a vehicle engine. In the construction shown, the injector 5 is of the type disclosed in copending United States patent application Ser. No. 941,754 entitled Electromagnetic Fuel Injector filed Sept. 13, 1978 in the name of James D. Palma and assigned to a common assignee. The injector 5 includes as major components thereof a body 10, a nozzle assembly 11, a valve 12 and a solenoid assembly 14 used to control movement of the valve 12.

In the construction illustrated, the body 10, is of circular hollow tubular configuration and includes an enlarged upper solenoid case portion 15 and a lower end nozzle case portion 16 of reduced external diameter relative to portion 15. An internal cylindrical cavity 17 is formed in the body 10 by a stepped vertical bore therethrough that is substantially coaxial with the axis of the body. In the construction shown, the cavity 17 provides a cylindrical upper wall 20, a cylindrical upper intermediate wall 22, a cylindrical lower intermediate wall 24 and a cylindrical lower wall 25. Such walls 20, 22 and 24 are of progressively reduced diameters relative to the wall next above, while the lower wall 25 is of enlarged diameter relative to wall 24 for a purpose to be described. In the construction shown, the cylindrical wall 24 is of stepped diameters whereby to provide an upper portion 24 of a diameter to loosely slidably receive the large diameter portion 73*a* of an armature 73, to be described in detail hereinafter, and a lower cylindrical wall portion 24*a* of a diameter greater than the wall portion 24. Walls 20 and 22 are interconnected by a flat shoulder 21. Walls 22 and 24 are interconnected by a flat shoulder 26. Walls 24 and 25, in the construction shown in FIG. 1, are interconnected by a beveled shoulder 27.

Wall portion 24*a* defines the outer peripheral extent of a fuel chamber 23 within the body 10, to be described in greater detail hereinafter. The body 10 is preferably provided with three, circumferentially equally spaced apart, radial port passages 30 in the nozzle case portion 15 thereof which open through the wall 24 to effect flow communication with the fuel chamber 23.

The injection nozzle assembly 11 mounted in the lower nozzle case portion 16 of body 10 includes, in succession starting from the upper end with reference to FIG. 1, a seat element 40, a swirl director plate 44 and a spray tip 50. The seat element 40, director plate 44 and spray tip 50 are stacked face to face and are positioned in the lower cavity formed by the cylindrical wall 25 in the lower nozzle case portion 16 in a manner to be described.

In the embodiment shown, the seat element 40 is provided with a central axial discharge passage 41 therethrough, this passage being tapered outward at its lower end whereby its outlet end diameter is substantially equal to the outside diameter of the annular groove 46 provided in the upper surface of the swirl director plate 44. The seat element 40 is also provided with a conical valve seat 42 on its upper surface 43, the valve seat being formed concentric with and encircling the upper end of the discharge passage 41. The upper surface 43 of the seat element 40, in the embodiment illustrated, is downwardly tapered adjacent to its outer peripheral edge. This tapered surface is formed at an angle of, for example, 10° to 11° from the horizontal so as to provide an abutment shoulder for the outer peripheral annular edge on one side of an abutment washer 48 for a purpose to be described.

The swirl director plate 44 is provided with a plurality of circumferentially, equally spaced apart, inclined and axially extending director passages 45. Preferably, six such passages are used, although only one such passage is shown in FIG. 1. These director passages 45, of predetermined equal diameters, extend at one end downward from an annular groove 46 provided on the upper surface of the swirl director plate 44. The groove 46, as shown, is positioned so as to encircle a boss 47 formed integral with the director plate to extend vertically upward from the upper surface of the main body portion thereof. The boss 47 thus extends vertically upward loosely into the discharge passage 41 so as to terminate at a predetermined location, a location that is axially spaced from the lower end of the valve element 12 when it is in its seated position shown.

The spray tip 50 is provided with a straight through passage 52 which serves as a combined swirl chamber-spray orifice passage for the discharge of fuel from this nozzle assembly. As shown the spray tip 50 is provided at its upper end with a recessed circular groove 51 of a size so as to receive the main body portion of the swirl director plate 44 therein whereby to locate this element substantially coaxial with the axis of the swirl chamber-spray orifice passage 52.

In the construction shown, the outer peripheral surface of the spray tip 50 is provided with external threads 56 for mating engagement with the internal threads 25*a* provided in the lower end of the body 10. Preferably the threads 25*a* and 56 are of suitable fine pitch whereby to limit axial movement of the spray tip, as desired, for each full revolution of the spray tip relative to body 10 as desired. The lower face of the spray tip 50 is provided, for example, with at least a pair of diametrically opposed blind bores 53 of a size so as to slidably receive the lugs of a spanner wrench, not shown, whereby rotational torque may be applied to the spray tip 50 during assembly and axial adjustment of this element in the body 10.

With the structural arrangement the stroke of the injector can be accurately adjusted by the use of a collapsible abutment member between the upper surface of the valve seat element 40 and the shoulder 27 of the body 10. The collapsible abutment member, in the construction shown, is in the form of a flat spring abutment washer 48 of a suitable outside diameter to be slidably received within the lower wall 25 so as to abut against shoulder 27 located a predetermined axial distance from the lower flat end of the core 63 of the solenoid assembly to be described hereinafter. The washer 48 when first installed would be flat. As thus assembled, the upper outer peripheral edge of the washer 48 would engage against the outer radial portion of the shoulder 27 and its radial inner edge on the opposite side of the washer would abut against the upper tapered surface 43 of the seat element 40. With the washer 48, seat element 40, swirl director plate 44, and the spray tip 50 thus assembled with the spray tip 50 in threaded engagement with internal threads 25*a*, these elements can then be axially adjustably positioned upward within the lower end of the body 10.

After these elements are thus assembled, in actual use during calibration of the injector, adjustment of the injector stroke is made while the injector is flowing calibration fluid on a continuous basis. During flow of the calibration fluid, an operator, through the use of a spanner wrench, not shown, can rotate the spray tip 50 in a direction whereby to effect axial displacement thereof in an upward direction with reference to FIG. 1. As the nozzle assembly is moved axially upward by rotation of the spray tip 50, the seat element 40 thus moved would cause the spring washer 48 to deflect or bend into a truncated cone shape, the position shown in FIG. 1, to thereby in effect forcibly move the lower abutment surface of the washer 48 upward relative to the fixed shoulder 27 until the desired flow rate is achieved to thereby axially position the valve seat 42 of the seat element 40 to thus establish the proper stroke length of the armature/valve for that injector. The spray tip 50 is then secured against rotation relative to the body 10 by any suitable means such as, for example, by laser beam welding at the threaded inner face of these elements.

With the above described arrangement, the effective flow orifice of the valve and valve seat interface as generated by injector stroke is controlled directly within very close tolerances by an actual flow measurement rather than by a mechanical displacement gauge measurement and this is accomplished after assembly of the injector. Also, with this arrangement, the necessity of gauging and of selective fitting of various components is eliminated. In addition, less injector rework after assembly would be required since means are provided to vary the stroke as desired.

An O-ring seal 54 is operatively positioned to effect a seal between the seat element 40 and the wall 25. In the construction shown in FIG. 1, the seat element 40 is provided with an external reduced diameter wall **40*b* at its lower end to receive the O-ring seal 54. The ring seal 54 is retained axially in one direction by the flat shoulder 40*c* of the seat element 40 and in the opposite direction by its abutment against the upper surface of director plate 44**.

Flow through the discharge passage 41 in seat element 40 is controlled by the valve 12 which is loosely received within the fuel chamber 23. This valve member is movable vertically between a closed position at which it is seated against the valve seat 42 and an open position at which it is unseated, from the valve seat 42, as described in greater detail hereinafter. The valve 12 is of a truncated ball-like configuration to provide a semi-spherical seating surface for engagement against the valve seat 42. As shown in FIG. 1, the valve 12 is made in the form of a ball which is truncated at one end whereby to provide a flat surface **12*a* on its upper side for a purpose to be described, the lower seating surface portion 12*b* thereof being of semi-spherical configuration whereby to be self-centering when engaging the conical valve seat 42. Valve 12 may be made of any suitable hard material which may be either a magnetic or non-magnetic material. For durability, as used in a particular fuel injection system, the valve 12** is made of SAE 51440 stainless steel and is suitably hardened.

To aid in unseating of the valve 12 from the valve seat 42 and to hold this valve in abutment against the lower end of its associated armature 73 when in its open position during periods of injection, a compression valve spring 55 is positioned on the lower side of the valve so as to be loosely received in the discharge passage 41 of seat element 40. As shown in FIG. 1, the valve spring 55 is positioned to abut at one end, its lower end with reference to FIG. 1, against the upper surface of director plate 44 and to abut at its opposite end against the lower semi-spherical portion of valve 12 opposite the flat surface **12*a*. Normal seating and actuation of the valve 12 is controlled by the solenoid assembly 14** in a manner to be described.

To effect filtering of the fuel being supplied to the injector 5 prior to its entry into the fuel chamber 23, there is provided a fuel filter assembly, generally designated 57. The fuel filter assembly 57 is adapted to be suitably secured, as for example by predetermined press fit, to the body 10 in position to encircle the radial port passages 30 therethrough. Although any suitable fuel filter assembly 57 can be used, in the embodiment illustrated, the fuel filter assembly 57 is of the type disclosed in Applicant's above-identified copending application Ser. No. 941,754, the disclosure of which is incorporated herein by reference thereto.

The solenoid assembly 14 of the injector 5 includes a tubular coil bobbin 60 supporting a wound wire coil 61. Bobbin 60 is positioned in the body 10 between the shoulder 26 thereof and the lower surface of a circular pole piece 62 that is slidably received at its outer peripheral edge within the wall 20. Pole piece 62 is axially retained within body 10 as by being sandwiched between the shoulder 21 and the radially inward spun over upper rim **15*a* of the body. Seals 80 and 81 are used to effect a seal between the shoulder 26 and the lower end of bobbin 60 and between the upper end of bobbin 60 and the lower surface of pole piece 62**.

Formed integral with the pole piece 62 and extending centrally downward therefrom is a tubular core 63. Core 63 is of a suitable external diameter so as to be slidably received in the bore aperture **60*b* that extends coaxially through the bobbin 60. The core 63, as formed integral with the pole piece 62, is of a predetermined axial extent so as to extend a predetermined axial distance into the bobbin 60 in axial spaced apart relation to the shoulder 27. The pole piece 62, in the construction illustrated, is also provided with an upstanding central boss 62*b*** that is radially enlarged at its upper end for a purpose which will become apparent.

Pole piece 62 and its integral core 63 are formed with a central through stepped bore **63*c*. The cylindrical annular wall, defined by the bore 63*c* is provided at its upper end within the enlarged portion of boss 62*b*, with internal thread 63*b*. A spring adjusting screw 70, having a tool receiving slot 70*a*, for example, at its upper end, is adjustably threadedly received by the thread 63*b***.

Pole piece 62 is also provided with a pair of diametrically opposed circular through slots, not shown, that are located radially outward of boss **62*b* so as to receive the upright circular studs 60*a* of bobbin 60, only one such stud 60*a* being shown in FIG. 1. Each such stud 60*a* has one end of a terminal lead 66 extending axially therethrough, the opposite end, not shown, of each such lead being connected, as by solder, to a terminal end of coil 61. The terminal end, not shown, of coil 61, the studs 60*a*, and of the through slots, not shown, in the pole piece 62 are located diametrically opposite each other whereby to enhance the formation of a more uniform and symmetrical magnetic field upon energization of the coil 61 to effect movement of the cylindrical armature 73 upward without any significant side force thereon to thereby eliminate tilting of the armature. Such tilting would tend to increase the sliding friction of the armature 73 on its armature guide pin 72**.

The cylindrical armature guide pin 72, made of suitable non-magnetic material, is provided with axially spaced apart enlarged diameter upper end portions whereby to define axially spaced apart cylindrical lands 72*a* that are of a diameter whereby they are guidingly received in bore 63*c* of the core 63 so as to effect coaxial alignment of the armature guide pin 72 within this bore and thus within the body 10. The enlarged upper end of the armature guide pin 72 is positioned to abut against the lower surface of the spring adjusting screw 70 while the reduced diameter opposite end of the armature guide pin 72 extends axially downward from the core 63, a suitable distance to serve as a guide for aligned axial movement of the armature 73 thereon. A suitable seal, such as an O-ring seal 54′, is sealingly engaged against a wall portion of the core 63 defining bore 63*c* and a reduced diameter portion of the armature guide pin 72 between the lands 72*a*.

The armature 73 of the solenoid assembly 14, as shown in the Figures, is of a cylindrical tubular construction with an upper portion of an outside diameter whereby this armature is loosely slidably received within the lower intermediate wall 24 of the body and in the lower guide portion of the bore aperture 60*b* of bobbin 60. The armature 73 is formed with a stepped central bore therethrough to provide an upper spring cavity 74 portion and a lower pin guide bore 75 portion of a preselected inside diameter whereby to slidably receive the small diameter end portion of the armature guide pin 72. As previously described, the armature is guided for its axial movement by the armature guide pin 72. The armature 73 at its lower end is provided with a central radial extending through narrow slot 76 formed at right angles to the axis of the armature. At its opposite or upper end, the armature 73 is also provided with at least one right angle, through narrow slot 76*a*, two such slots being shown in the armatures illustrated.

A shim 78 of washer-like configuration, made of suitable non-magnetic material and of a predetermined thickness, is positioned axially between the lower end surface 63*s* of the core 63 and the upper end surface of the armature 73, as by having this shim abutting against the lower end surface 63*s* of the core 63 for a purpose to be described next hereinafter.

With this arrangement, the armature 73 is thus slidably positioned for vertical axial movement between a lowered position, as shown, at which it abuts against the upper flat surface 12*a* of valve 12 to force the valve into seating engagement with the valve seat 42 and a raised position at which the upper end of the armature 73 abuts against the lower end of the core 63 with the shim 78 sandwiched therebetween. When the armature 73 is in its lowered position, an air gap is established between the lower end surface 63*s* of the core 63 and the upper end surface 73*s* of the armature 73. This air gap can be preselected as desired.

In a particular construction of the injector 5 for use in a specific fuel injection system, the air gap or axial extent between the lower end surface 63*s* of the core 63 and the upper end surface 73*s* of the armature 73, when the latter is in its lowered position shown, was approximately 0.006 inch. In this construction, the shim 78 was 0.002 inch thick. Thus, although the air gap was approximately 0.006 inch in axial length, with the shim 78 positioned in this air gap, the actual axial extent of movement of the armature upon energization of the solenoid was approximately 0.004 inch.

Armature 73 is normally biased to its lowered position with the valve 12 seated against the valve seat 42 by means of a coil return spring 77 of a predetermined force value greater than that of the valve spring 55. Spring 77 is positioned in the spring cavity 74 and in the bore of core 63. The spring 77 is thus positioned to encircle the lower reduced diameter end of the guide pin 72 with one end of the spring positioned to abut against a radial shoulder 73*c* at the bottom of the spring cavity 74 and, at its opposite end, the spring 77 abuts against a radial shoulder 72*b* of the armature guide pin 72 whereby to bias this pin into abutment against the spring adjusting screw 70.

Now in accordance with the invention, it has been found that the hydraulic stiction or adherence force during operation of an electromagnetic fuel injector can be suitably controlled by regulation of the surface texture or finish of the opposed working air gap surfaces. In this regard it has now been found that the rougher the finish of a working air gap surface, within certain limits, the lower the hydraulic stiction or adherence force at these surfaces during operation of the injector.

Accordingly, in accordance with the invention at least one, and preferably the physically softer of the opposed working air gap surfaces of the injector is provided with a predetermined roughened surface texture whereby the hydraulic stiction or adherence force at the pole, shim and armature interfaces is controlled during normal injector operation.

It has also been found that improved operational durability with limited flow change will result if preferably one of the opposed working air gap surfaces is physically hard and relatively smooth while the other surface is relatively physically soft and rough, within predetermined limits.

With respect to the injector structure disclosed, in a preferred embodiment thereof for a particular application, the upper surface of the armature 73 is case hardened for wear resistance. Thus with respect to this embodiment of the electromagnetic fuel injector, it has been determined that the roughened surface texture should be applied to the core 63 of the pole piece 62 or to the shim 78 if the latter is bonded to the core 63 of the pole piece 62.

Figure 2:
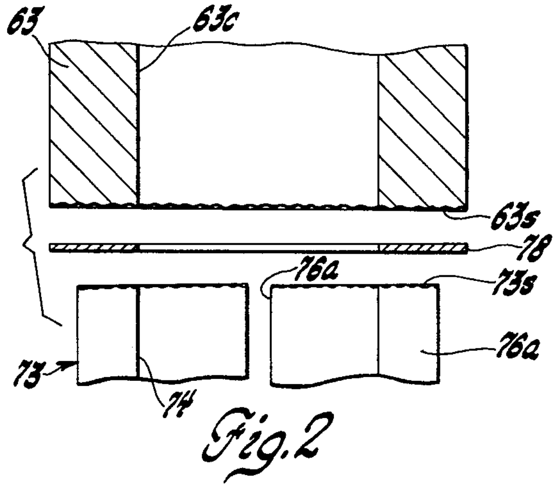
FIG. 2 is an enlarged cross-sectional view of a portion of the pole piece and armature of the injector of FIG. 1, with the non-magnetic shim loosely positioned therebetween.

Thus there is shown in FIG. 2 an embodiment of a pole piece and armature arrangement wherein a non-magnetic shim 78 is loosely positioned between the core 63 of the pole piece 62 and the armature 73. The surface 73*s* of the armature in this embodiment being case hardened for the purpose described above. Accordingly, in accordance with the invention, in this embodiment shown in FIG. 2, the surface 63*s* of the core 63 of pole piece 62 is provided with a predetermined roughened surface texture over its entire surface area, the surface texture characteristics thereof having an average surface rating value on the order of 16 to 32 microinches (0.40 to 0.80 micrometers) in accordance with the designations set forth in SAE Standard J448a. This Standard appears, for example, in the 1976 SAE Handbook published by the Society of Automotive Engineers, Inc., 400 Commonwealth Drive, Warrendale, Pa. Also in this embodiment, the surface 73*s* of the armature 73 can have a roughened surface texture over its entire surface area of a roughness average rating value of 8 to 12 microinches (0.20 to 0.30 micrometers) maximum.

Figure 4:
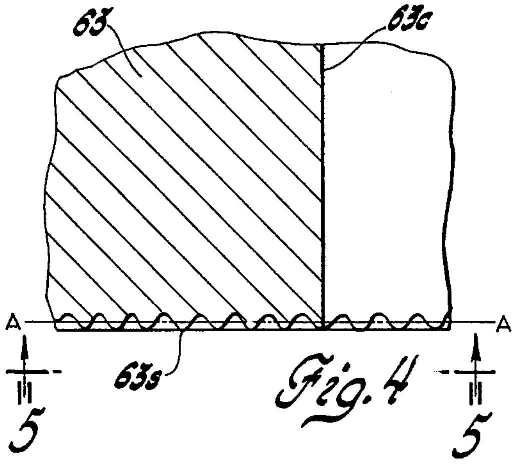
FIG. 4 is a further enlarged view of a portion of the pole piece of FIG. 2 showing the surface roughness on the working face thereof greatly exaggerated; and, FIG. 5 is an end view of the pole piece taken along line 5—5 of FIG. 4 showing the direction of lay of the surface texture thereon.

The above described roughness of the surface 63*s* of the core end of the pole piece 62 is graphically shown, greater enlarged, in FIG. 4, with the surface 63*s* as thus roughened having peaks and valleys extending from opposite sides of the center line. This center line, also known mathematically as the medium line, is the line about which roughness is measured and is the line A—A in FIG. 4 that extends parallel to the general direction of the lower end surface profile of the core 63, within limits of the roughness, such that the sum of the areas contained between it and those parts of the profile which lie on either side of it are equal. As is well known and as used herein, the roughness average rating values are in micrometers 0.000001 meter (microinch 0.000001) arithmetical average deviation from the medium line, line A—A in FIG. 4.

Figure 5:
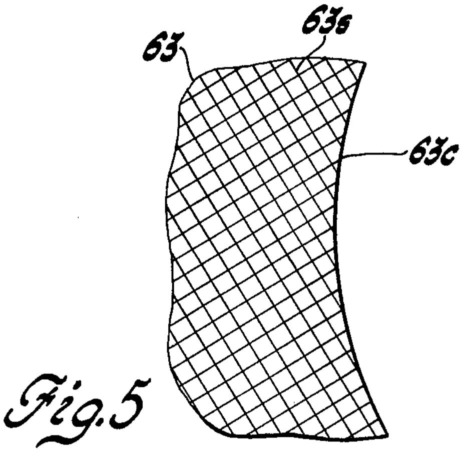

Preferably as shown in FIG. 5, the lay or direction of the dominate pattern of the roughness on the surface 63*s* is in at least two directions, with these directions being preferably at right angles to each other as shown in FIG. 5.

This roughness on the surface 63*s* in the embodiment just described can be obtained by grinding the surface 63*s*, preferably after all other manufacturing process steps, including heat treatment, on the part have been completed so that the grinding operation, in addition to providing the roughened surface, will substantially eliminate any waviness in the surface due to heat treatment and so as to also insure that the plane of this surface is at right angles within a predetermined tolerance to the axis of this part. Since the grinding operation will result in the formation of the peaks and valleys but with some of the peaks projecting above the majority of the peaks on the ground surface, it is preferred that the surface be lightly lapped so as to remove these excessively high peaks whereby the finished surface roughness will have substantially all of the peaks lie in a common plane, as graphically shown in FIG. 4 wherein all of the peaks and valleys are shown, for purposes of illustration, only laying in their respective common planes.

Of course it will be apparent to those skilled in the art in view of the disclosure herein that, if in a particular injector application, the non-magnetic shim 78 is not used between the opposed working air gap surfaces of the core and of the pole piece 62 and armature 73, then the lower surface 63*s* of the core 63 would still be provided with the more roughened surface, as shown in FIG. 2, assuming as in the example described above, that the surface 73*s* of the armature 73 is physically harder than the surface 63*s*.

Figure 3:
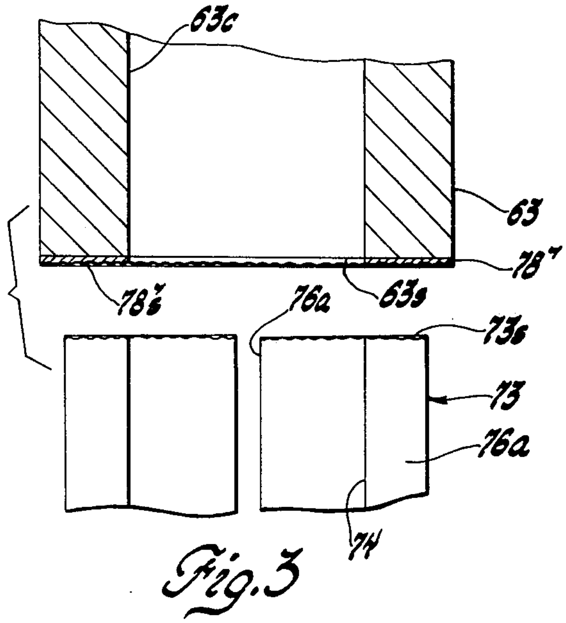
FIG. 3 is a view similar to FIG. 2 but showing the non-magnetic shim fixed to the pole piece.

Referring now to FIG. 3, there is shown a pole piece and armature arrangement for an electromagnetic fuel injector wherein a non-magnetic shim 78' is suitably secured, as for example, to the lower surface 63*s* of the core and of the pole piece 62. In this embodiment, assuming the upper surface 73*s* of the armature is case hardened then this shim 78' will be the physically softer surface and, accordingly, will be provided on its exposed surface 78'*s* with a roughened surface texture having a surface roughness rating on the order of 16 to 32 microinches suitably formed therein.

In this example, the surface 73*s* of the armature, since it is physically harder than the material of the shim 78', which is normally a relatively physically soft material, should be relatively smooth compared to the exposed surface of the shim 78'. In a particular application, with reference to the embodiment shown in FIG. 3, the surface texture on the surface 73*s* of the armature 73 had a surface roughness rating of 12 microinches maximum and, preferably this surface should be lapped so as to provide a relatively smooth surface texture thereon compared to the exposed surface 78'*s* of the shim 78'. Thus in this embodiment wherein the surface 73*s* of the armature is case hardened for wear resistance, this surface 73*s* should be substantially smoother relative to the roughened surface finish on the shim 78'.

If the hardened surface 73*s* of the armature is not made relatively smooth, the texture of this surface upon contact with the shim 78' will be imprinted into the exposed surface of the shim 78', because such a non-magnetic shim is normally physically soft. As a result thereof, the hydraulic stiction forces will actually increase since the textured surface 73*s* of the armature will engage its imprint pattern on the shim 78' at the end of the valve opening movement of the armature.

By providing a controlled, grooved surface on the working air gap surface of the pole piece 62 or on a shim 78' secured thereto, there is provided a means whereby to effect hydraulic cushioning across the opposed working air gap surfaces. That is with such a roughened surface texture on one of the working air gap surfaces, each groove between a valley and adjacent peaks provided thereby defines a fluid flow channel containing fuel for the controlled flow of fluid as the opposed working air gap surface approach and come into contact with each other. Fluid remaining in each of the grooves in the roughened air gap working surface will then be operative so as to substantially reduce or eliminate vacuum locking as these working air gap surfaces are separated from each other during the next separation movement of the armature 73 relative to the pole piece 62.

It has been found that if the surface roughness of the opposed working air gap surfaces is increased beyond the preferred limits described above, then during contact of these opposed working surfaces, portions of the peaks on the more roughened surface can break away. Since the working air gap is relatively small, this material would normally lodge in one of the grooves defined by each of the valleys and adjacent peaks. Such material would then, in effect, block that flow channel for fluid flow. In addition, such material broken away can be impacted, for example, into the more physically soft material of a working surface to in effect cause that surface to become more smooth with the result that further impacts and/or cavitation wear will result, whereby the percentage of true contact area between the surfaces of the pole piece and armature will increase with time. This of course would negate the original purpose for providing such a roughened surface on one of the opposed working air gap surfaces.

While the invention has been described with reference to the electromagnetic fuel injector disclosed herein, it is not confined to the details set forth since it is apparent that either one or both of the opposed working air gap surfaces can be roughened in any manner with the lay in any desired direction for the purpose disclosed. However, as described, preferably the roughened textured surface should be on the more physically softer surface and the relatively smoother surface should be on the more physically hard surface. This application is therefore intended to cover such modifications or changes as may come within the purposes of the invention as defined by the following claims.

The embodiments of the invention in which an exclusive property or privilege is claimed are defined as follows:

1. In an electromagnetic fuel injector of the type having a hollow tubular body with a stepped bore therethrough providing a fuel chamber therein intermediate its ends adapted to receive fuel, a fuel nozzle positioned in the stepped bore at one end of the body to define a spray tip at the one end and an annular valve seat encircling a discharge passage upstream of the spray tip in communication with the fuel chamber, a valve positioned in the stepped bore for movement into and out of engagement with the valve seat and a solenoid means including stationary pole means and an armature means operatively associated with the valve for controlling movement thereof, the armature means being movable axially in the bore and positioned so as to move into and out of engagement relative to one end of the pole means; the improvement wherein at least one of the opposed end surfaces of the pole means and of the armature means has a roughened surface texture with an average surface roughness rating value of the order of 16 to 32 microinches whereby, during operation, the wear caused by impact or fluid cavitation at said surfaces will be substantially reduced so as to permit for the extended usage of the injector without effecting the original calibration of the injector.

2. In an electromagnetic fuel injector of the type having a hollow tubular body with a stepped bore therethrough providing a fuel chamber therein intermediate its ends adapted to receive fuel, a fuel nozzle positioned in the stepped bore at one end of the body to define a spray tip at the one end and an annular valve seat encircling a discharge passage upstream of the spray tip in communication with the fuel chamber, a valve positioned in the stepped bore for movement into and out of engagement with the valve seat and a solenoid means including stationary pole means and an armature means operatively associated with the valve for controlling movement thereof, the armature means being movable axially in the bore and positioned so as to move into and out of engagement relative to one end of the pole means; the improvement wherein at least the physically softer of one of the opposed end surfaces of the pole means and has a roughened surface texture with an average surface roughness rating value of the order of 16 to 32 microinches whereby the hydraulic stiction between these surfaces is reduced so that during operation the wear at said surfaces will also be substantially reduced resulting in extended calibrated operational durability of the injector.

3. In an electromagnetic fuel injector of the type having a hollow tubular body with a stepped bore therethrough providing a fuel chamber therein intermediate its ends adapted to receive fuel, a fuel nozzle positioned in the stepped bore at one end of the body to define a spray tip at the one end and an annular valve seat encircling a discharge passage upstream of the spray tip in communication with the fuel chamber, a valve positioned in the stepped bore for movement into and out of engagement with the valve seat and a solenoid means including a stationary pole piece, an armature movable axially in the bore relative to the pole piece operatively associated with the valve for controlling movement thereof, spring means positioned for normally biasing the armature in a direction away from the pole piece to effect engagement of the valve with the valve seat and a non-magnetic shim positioned between the working air gap surfaces of the pole piece and armature, the armature being movable axially in the bore and positioned so as to move into and out of engagement relative to one end of the pole piece; the improvement wherein the end surface of the pole piece adjacent to the armature has a roughened surface texture with an average surface roughness rating value of the order of 16 to 32 microinches and the end surface of the armature is physically harder and smoother relative to the pole piece end surface so that the wear at said surfaces will be substantially reduced permitting extended usage of the injector without substantial adverse effects on the original calibration of the injector.

4. In an electromagnetic fuel injector of the type having a hollow tubular body with a stepped bore therethrough providing a fuel chamber therein intermediate its ends adapted to receive fuel, a fuel nozzle positioned in the stepped bore at one end of the body to define a spray tip at the one end and an annular valve seat encircling a discharge passage upstream of the spray tip in communication with the fuel chamber, a valve positioned in the stepped bore for movement into and out of engagement with the valve seat and a solenoid means including stationary pole means and an armature operatively associated with the valve for controlling movement thereof, the armature being movable axially in the bore and positioned so as to move into and out of engagement relative to one end of the pole means; the improvement wherein a non-magnetic shim of physically softer material than the working air gap end surface of the armature is fixed to the pole means and wherein the exposed end surface of said shim has a roughened surface texture with an average surface roughness rating value of the order of 16 to 32 microinches whereby, during operation, the wear caused by impact or fluid cavitation between said shim and the armature will be substantially reduced so as to permit for the extended usage of the injector without any substantial effect on the original calibration of the injector.

* * * * *